(12) United States Patent
Lidman

(10) Patent No.: US 6,852,172 B1
(45) Date of Patent: Feb. 8, 2005

(54) METHOD AND APPARATUS FOR CLEANING OF A MILKING PLANT

(75) Inventor: Magnus Lidman, Rönninge (SE)

(73) Assignee: DeLaval Holding AB (SE)

( * ) Notice: Subject to any disclaimer, the term of this patent is extended or adjusted under 35 U.S.C. 154(b) by 55 days.

(21) Appl. No.: 10/088,280

(22) PCT Filed: Sep. 12, 2000

(86) PCT No.: PCT/SE00/01761
§ 371 (c)(1),
(2), (4) Date: Mar. 15, 2002

(87) PCT Pub. No.: WO01/19175
PCT Pub. Date: Mar. 22, 2001

(30) Foreign Application Priority Data
Sep. 15, 1999 (SE) ................................................ 9903288

(51) Int. Cl.⁷ ............................. B08B 3/04; B08B 5/04; B08B 9/053
(52) U.S. Cl. ..................... 134/21; 134/22.11; 134/25.1; 134/95.1; 134/169 C; 134/169 R
(58) Field of Search ....................... 134/21, 22.1, 22.11, 134/22.18, 25.1, 95.1, 169 R, 169 C (56) References Cited

U.S. PATENT DOCUMENTS

| | | | | |
|---|---|---|---|---|
| 3,062,224 A | * | 11/1962 | Skett et al. ............... | 134/58 R |
| 3,067,756 A | * | 12/1962 | Bruggink, Sr. ............. | 134/94.1 |
| 3,173,434 A | * | 3/1965 | Bender .................. | 134/169 R |
| 3,310,061 A | * | 3/1967 | Bender .................. | 134/58 R |
| 3,916,923 A | * | 11/1975 | Branton ................. | 134/57 R |
| 4,061,504 A | * | 12/1977 | Zall et al. .................. | 134/95.1 |
| 4,168,677 A | * | 9/1979 | Brown ................... | 119/14.18 |
| 4,403,569 A | | 9/1983 | Bennett | |
| 4,572,105 A | | 2/1986 | Chowdhury et al. | |
| 5,405,452 A | * | 4/1995 | Anderson et al. ......... | 134/22.12 |
| 6,323,033 B1 | * | 11/2001 | van den Berg ............... | 436/23 |

FOREIGN PATENT DOCUMENTS

| | | |
|---|---|---|
| DE | 3422452 A1 | 12/1985 |
| EP | 0 626 130 A1 | 11/1994 |
| GB | 2 095 088 A | 9/1982 |

* cited by examiner

Primary Examiner—Frankie L. Stinson
Assistant Examiner—Saeed Chaudhry
(74) Attorney, Agent, or Firm—Boyle, Fredrickson, Newholm, Stein & Gratz, S.C.

(57) ABSTRACT

A milking plant for milking animals, such as cows, wherein milk collecting means, prefeably in the form of teat cups, are attached to the teat of the animal whereafter milk is taken from the animal by use of vacuum. The milk is transported by a milk line system (31) to milks storage means comprising a cooling tank (30). For cleaning purposes the milk line system from each milk collecting means can be shut off from the milk tank by valve means (32) in order for separate cleaning of the milk line system. The invention is characterized by preventing any possible leakage of detergent from a cleaning fluid to the milk that has been collected in the milk tank, by providing a pressure difference between the two fluids. The pressure difference between the fluids is preferably achieved by connecting the cleaning fluid to the vacuum supply (4) of the milking plant.

24 Claims, 5 Drawing Sheets

METHOD AND APPARATUS FOR CLEANING OF A MILKING PLANT

TECHNICAL FIELD

The present invention relates to a milking plant for milking animals, such as cows, and preferably though not exclusively to plants comprising milking robots operating with vacuum to collect milk from the animals, wherein the milk is transported by a milk line system to a cooling tank. The invention relates particularly to the cleaning of milking equipment using a cleaning fluid such as water, or a detergent, flowing through the milk line system.

BACKGROUND OF THE INVENTION

In traditional milking with manual handling of the equipment a large number of cows are milked simultaneously one to four hours every morning and night. After each milking a manual adjustment is made wherein teat cups used to collect milk from the cows are placed on teat dummies. Rinsing water and later a detergent solution, is sucked from a washing machine through the teat dummies into the teat cups, and onwards through the milking equipment. The fluid transport is driven by a vacuum suction, for instance at an underpressure of 50 kPa, to a collecting chamber, usually called an end unit. Many different vacuum-driven milk transport arrangements have been disclosed, such as U.S. Pat. No. 4,432,700, GB 2095088 and DE 3422452 by WESTFALIA SEPARATOR AG, and DE 2548601 by Miele, which are hereby incorporated by reference.

Generally, the end unit comprises a pump, transporting fluid against the pressure difference out towards the atmospheric pressure. The pipe connection, which during milking is connected to the cooling tank, is moved out of the cooling tank before washing, into a cleaning sleeve. The cleaning sleeve has an output, which is connected to the washing machine. A closed cleaning loop is thus obtained for cleaning in place (CIP). The technique known as CIP is inherited from the dairy industry, and is intended to indicate that rinsing water and detergent solution are circulated through tanks, pipes and process lines without the equipment having to be dismantled.

For the traditional milking equipment, a cleaning loop is formed by manually disconnecting the milk line system from the milk-cooling tank and connecting it to a cleaning fluid system. The milk tank itself is cleaned separately after having been emptied.

When using so called voluntary milking systems, VMS, the milking plant is in operation all hours of the day, having milk stored and transported through pipe systems and tanks. There are thus no natural breaks in the milking providing the opportunity to traditional cleaning or washing. This makes it necessary to divide the milking plant into sub-systems, which are cleaned separately on different times. The only exception, which can be anticipated, is a common cleaning of the entire plants each time the cooling tank has been emptied. Since the tank is generally emptied with an interval of two days, the cleaning frequency is obviously inadequate.

As examples of such sub-systems, the following can be mentioned:

Teat rubbers are rinsed and sometimes disinfected between every cow that is: milked. The water that is used must not leak into the milk.

The quality of the milk is supervised for each milked cow, generally by inspecting the so-called pre-milk, obtained from the teat cavity from the animal. If the milk does not meet up to standards, all the milk from the present cow has to be dumped. All parts of the equipment that has been in contact with the milk are washed afterwards.

The pipe system of the milk line system, comprising pipes and valves, transporting milk from the robot to the cooling tank, often about 20 to 30 meters, needs to be washed a couple of times each day in order to prevent bacterial growth on surfaces that have been in contact with the milk.

Between robot and milking tank there is often a milk filter that has to be changed or washed several times a day, at the same time as the filter housing is washed.

A VMS plant can consist of one milking station only, but for larger plants a number of stations are by necessity working in parallel, but which can be cleaned individually.

In some type of plants the cooling tank is washed separately after being emptied. The milk that is produced during the cleaning of the milking tank is then temporarily stored in a buffer tank. The buffer tank is emptied and washed once the cooling tank is taken back into operation.

The division into separately cleaned sub-systems provides a need for a security system preventing mixture of detergent solution into the milk even if a system separating valve should leak.

In dairy industries the same problem was earlier solved by removing a piece of pipe between parts of the equipment that were washed and parts that contained milk. A similar procedure is used in traditional milking plants. The connection pipe or hose, from the milk-line system to the milk cooling tank is moved manually to a cleaning fluid supply connection for washing.

When the demand for automation made manual pipe removing in dairy industries impossible an analogue solution was developed in the form of valves. System separating valves were used in doubles and were provided with a drained pipe extension in between. In practice, a closing valve was used combined with a three-way valve. The latter opened for drainage of the intermediate pipe when the valves closed of the milk supplies. Later developments originating from the dairy industry has provided double seat valves with a different types of drained chambers between the seats. A drawback for the solutions provided for the dairy industry is that unwashed parts of the equipment are obtained between the sub-systems. The pipe system in a dairy is however enough extensive to provide possibility to shift between different sections so that also border zones are washed. For double seat valves of the "mixed proof" type one has often the possibility of washing and steam sterilising the mid chamber.

Milking plant systems, however, must for a foreseeable future, due to economical reasons if no other, be much simpler. Therefore the basic problem of preventing mixture of detergent into the milk has to be solved in another way.

OBJECT OF THE INVENTION

It is thus an object of the present invention to provide means and methods for cleaning of milking equipment in milking plants. More specifically it is an object to provide a safe and secure cleaning of the milk line system, with a low risk for detergent from the cleaning fluid to mix in with the milk, without the need of extensive piping or valve arrangement.

SUMMARY OF THE INVENTION

A The present invention is directed towards the milking plant for milking animals, such as cows, wherein milk collecting means, preferably in the form of teat cups, are attached to the teat of the animal whereafter milk is taken from the animal by use of vacuum. The milk is transported by a milk line system to a milk storage means comprising a cooling tank in which milk from all, or at least several animals, is stored. For cleaning purposes the milk line system from each milking station, that is milk collecting means, can be shut of from the milk tank by valve means in order for separate cleaning of the milk line system. The invention is characterised by preventing any possible leakage of detergent from a cleaning fluid to the milk that has been collected in the milk tank, by providing a pressure difference between the two fluids.

The two fluids are mechanically separated by the said valve means, but there is a always a risk for a valve to leak. By applying a higher pressure on the milk then on the cleaning fluid, the cleaning fluid cannot penetrate into the milk in case of leakage. Milk however can of course leak out through the valve into the cleaning fluid. Although neither this is desirable, the damage is limited to a somewhat decreased result of washing and a smaller amount of lost milk. Furthermore, leakage of milk will give rise to a substantial colouring of the water or detergent solution used as cleaning fluid, even at very low concentration, and is therefore easily spotted by suitable monitoring means. In a preferred embodiment of the invention, the pressure difference between the fluids is obtained by connecting the cleaning fluid to the vacuum supply of the milking plant.

BRIEF DESCRIPTION OF THE DRAWINGS

For a better understanding of the invention and to show how the same may be carried into effect reference will now be made by way of example into the accompanied drawings of which

DETAILED DESCRIPTION OF PREFERRED EMBODIMENTS

During cleaning of milking equipment it is common to suck in and rinse water, alkali washing solution, sour washing solution and disinfection solution through the teat cups from a container at atmospheric pressure. The underpressure in the connection point, i.e. the washing shelf with the teat dummies, makes the connection easy: the teat cups hold on by suction and no cleaning fluid leaks out. This method has turned out to be reliable and is useful also for milking robots. The cleaning fluid container is generally comprised as a part of a washing machine. The cleaning fluid is sucked and pumped through the milking equipment to a connection point were it is to be returned to the cleaning fluid container, thereby obtaining a circulation loop. In the vicinity of this connection point in a milking equipment, a system separating valve which must not leak is located. The system separating valve, which must be present, is placed between the milk transport line system (milk line system) and the milk-cooling tank. According to the present invention the risk for leakage of cleaning fluid into the milk is avoided by providing a pressure difference, so that the pressure of the cleaning fluid is lower than the pressure of the milk, on the respective sides of the system separating valve.

The pressure difference can be obtained either by raising the pressure on the milk side or by lowering it on the cleaning fluid side. A positive pressure on the milk side can be obtained by simply placing it high enough for the hydrostatic pressure in the connection point to provide sufficient security. This may however be inconvenient for other conceivable reasons. Another way of providing an increased pressure on the milk side is to use a pump directing the flow towards the system separating valve. Since the milk in the cooling tank is a delicate product, this is not a desirable solution. Neither is increasing the pressure in the cooling tank by pneumatic means, since the milk tank is fairly large.

The preferred procedure for obtaining the pressure difference, according to the invention, is instead to use the milking vacuum supply to lower the pressure on the cleaning fluid side in order to obtain the desired security against leakage. The return connection for the cleaning fluid must, with the proposed solution, have a return pump sucking the cleaning fluid at an underpressure and pumping it to the cleaning fluid container, which as mentioned is at atmospheric pressure.

Figure 1:
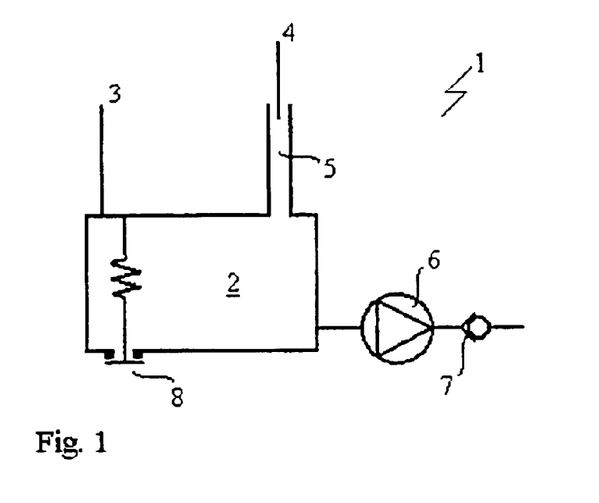
FIG. 1 shows an air separator and a cleaning fluid return pump, with a connection to the vacuum system of the milking plant in accordance with the invention.

The function of the return pump, or wash pump, is the same as for the end unit of the milking equipment, but the operational conditions are quite different. Milk requires delicate pumping without the mixture of air, where as for the case of cleaning fluid it is desirable to keep the volume in the pump equipment to a minimum in order to decrease the volume of the cleaning fluid. Thereby money is saved and the environmental stress is minimised. The desire to have a small cleaning fluid volume has a great impact for a VMS plant, which is washed several times a day. The flow of detergent solution, rinse water etc. which the return pump must handle is mixed up with air that is sucked into the cleaning loop. FIG. 1 shows the return pump arrangement 1 in a proposed embodiment in the inventive milking plant. Due to the mixture of air in the cleaning fluid is provided an air separator 2 in immediate upstream connection with the return pump 6, which preferably is a centrifugal pump. The return flow of cleaning fluid enters the air separator at 3, and during transport in the air separator to the pump 6 inlet, any air present in the cleaning fluid rises to the free liquid surface and is thus released from the cleaning fluid. The milking vacuum system is connected to the air separator at 4, serving both as an air recipient of the air separator, and as an underpressure provider for the cleaning fluid loop. The connection to the vacuum system at 4 is preferably preceded by a substantially vertical part 5 with such inner surface and such inner arrangement that any fluid drops present in the air stream falls back into the air separator 2. When the return pump 6 is shut of the non-return valve 7 prevents suction back into the air separator. When the connection to the vacuum at 4 and a return valve at the inlet to the air separator 3 (not shown) are closed, the air separator is drained by means of a valve arrangement 8. Down-streams the non-return valve 7, the cleaning fluid is returned into a washing machine (not shown).

It is of outmost importance that the return pump arrangement has a larger capacity than the largest flow of cleaning fluid. Otherwise the air separator will cease to work and washing fluid will be sucked into the vacuum line. The air separator 2 and the return pump 6 will therefore often be emptied from cleaning fluid. The return pump 6 must thus be able to pump again once cleaning fluid flushes in. Centrifugal pumps of simple design have in these cases generally substantial start-up problems. Centrifugal pumps sucking in air-mixed flow of fluid separates the air in the central part of the pump. An air cavity is then obtained at the centre of the impeller of the centrifugal pump, so that only the outer portion of the pump house comprises a rotating ring of fluid. When the air cavity is large enough in diameter, the pump-work ceases completely. The amount of air that has to be collected before the pump ceases to work is dependent on the output pressure of the pump. It has, however, been found that an air separator connected directly to the pump inlet also has the ability to de-air the central part of the pump during operation.

Figure 2:
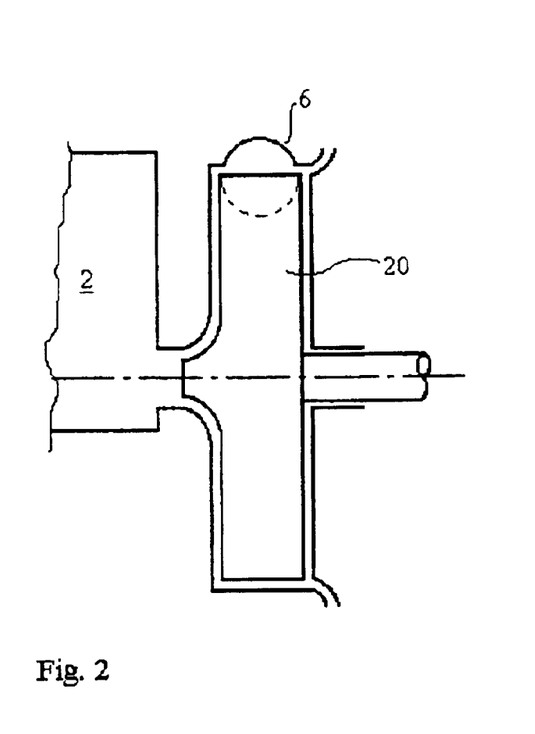
FIG. 2 shows a preferred embodiment of the pump connected into the air separator, from FIG. 1, according to the invention.

FIG. 2 shows a proposed embodiment of the pump 6 with an impeller 20, and its connection to the air separator 2, which is designed to secure the functionality of the pump even if a fluid with a high degree with mixed-in air is sucked in. When a pump of the proposed design has been emptied it will also start to pump immediately once new fluid is provided through the air separator. The proposed pump as illustrated in FIG. 2 thus makes it possible to work with a small volume of cleaning fluid and with sufficient over-capacity for the return pump.

Figure 3:
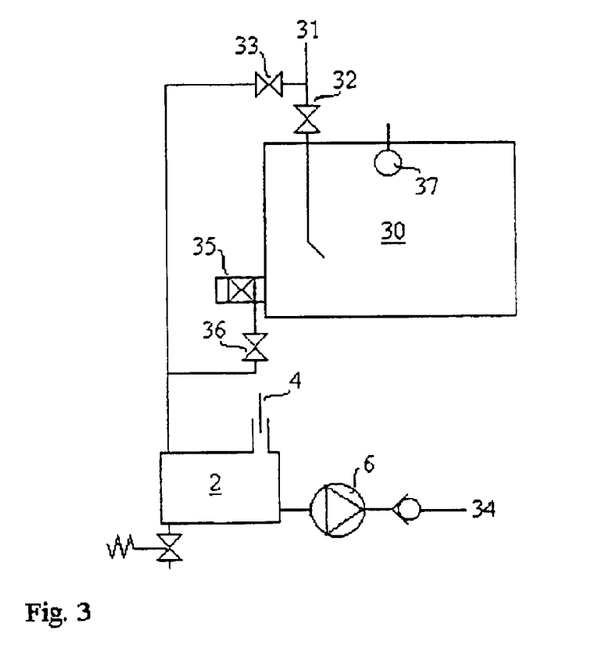
FIG. 3 shows the milk tank, parts of the milk line system and parts of the cleaning system in an embodiment of the present invention.
Figure 4:
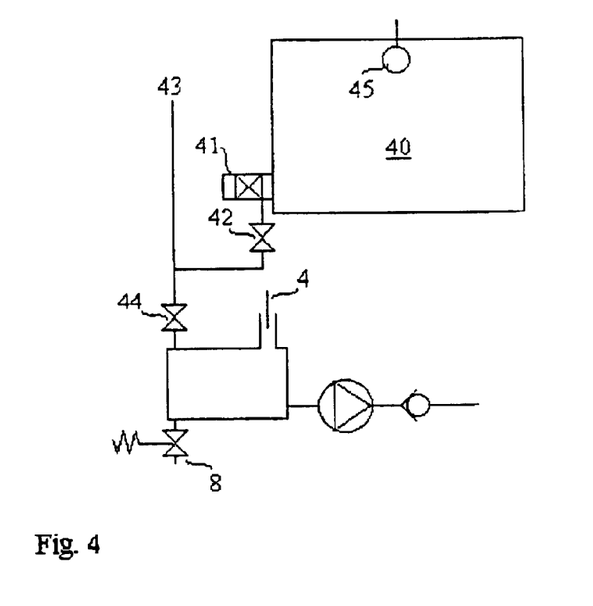
FIG. 4 shows parts of another embodiment of the milking plant according to the invention, similar to that of FIG. 3.
Figure 5:
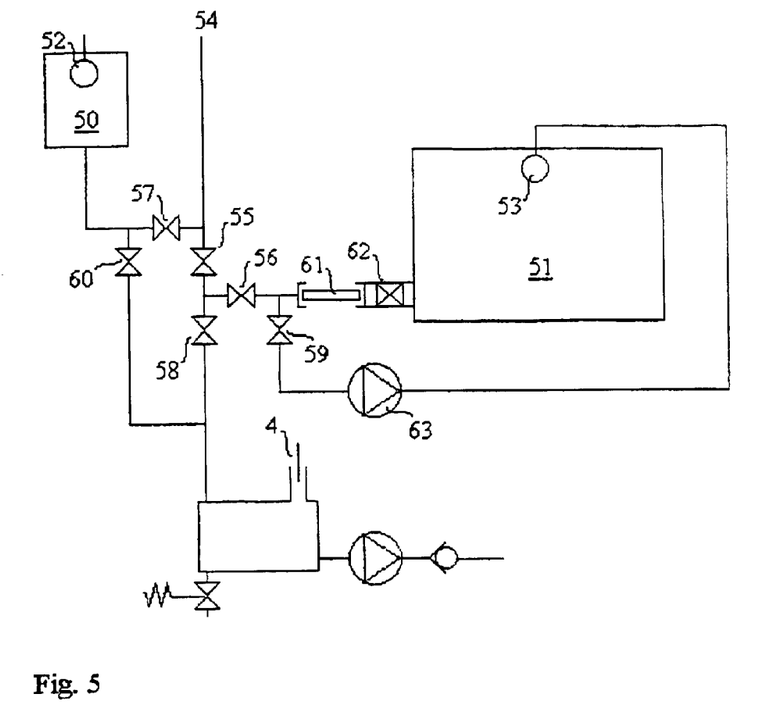
FIG. 5 shows parts of yet another embodiment of the present invention, in which the milking plant makes use of a buffer tank.

Different embodiments of the milking plant according to the invention, comprising the return pump arrangement with the air separator as illustrated in FIG. 1, are shown in FIG. 3–5. The milk line system stretches from the milking robot, which is located at the milking stations were the animals are milked, to the milk room where the milk cooling tank is located. The milk line system from station to cooling tank is often about 20–30 meters long and needs to be washed 2–4 times a day, whereas the cooling tank generally is emptied and subsequently cleaned every two days. There are thus two main alternatives:

a) The milk production is halted during the emptying and cleaning of the cooling tank. Therefore the entire milking plant is washed simultaneously.

b) The milk flow is led to a buffer tank during emptying and cleaning of the cooling tank.

FIG. 3 shows the milk-cooling tank 30, to which milk is supplied from the milk line system at 31. The cooling tank can be closed of from the milk line system by a valve 32, and a valve 33 is able to connect the milk line system with the return pump arrangement at the bottom of the picture. As previously described, the output of the return pump arrangements at 34 leads to the washing machine for the cleaning fluid. At the bottom of the cooling tank there is an output connection 35 for emptying the milk tank to a milk transport vehicle. This output connection may also be connected to the return pump arrangement by valve 36. At the top of the cooling tank a cleaning device 37 is shown, connectable to the cleaning fluid container (not shown) for cleaning the interior of the cooling tank.

During milk production valve 32 is opened and valve 33 is closed, so that milk from the milking robots is led from the milk line system 31 to the cooling tank 30 where it is stored until the milk transport vehicle arrives. In case the milk line system has to be cleaned although the milk tank is not emptied, valve 32 is closed and valve 33 is opened. In a manner as previously described the teat cups at the milking station are placed on cleaning fluid injectors comprising teat dummies, and the cleaning fluid is then sucked into the milk line system 31 and down through the air separator 2 and back to the washing machine by connection 34. Thanks to the connection 4 between the cleaning fluid system and the vacuum supply, the pressure on the cleaning fluid side of valve 32 is lower than the pressure of the milk side.

When the milk tank is to be emptied valve 32 is closed and then connection 35 is connected to a milk transport vehicle. At the same time valve 33 is opened in order to drain the milk line system through the return pump arrangement. After the milk tank has been emptied the connection 35 is closed, the cleaning device 37 in the cooling tank is activated and the cleaning fluid supplied therefrom is drained through the opened valve 36 to the return pump arrangement. Also the valves 32 and 33 are opened, capabelising cleaning of the entire milking equipment. During this stage there is no vacuum connection at 4 between the return pump arrangement and the milking vacuum supply, the circulation of the cleaning fluid only being driven by the return pump 6.

Another embodiment of the milking plant according to the invention is illustrated in FIG. 4. This is a simpler design of that in FIG. 3, in the sense that filling and emptying of milk to the cooling tank 40 goes through the same opening 41. During milking valve 42 is opened leading the milk line system 43 to the milk tank 40, whereas valve 44 to the return pump arrangement is closed. During washing of the milk line system only, and not the cooling tank, valve 42 is closed and valve 44 is opened. The connection 4 to the vacuum supply of the return pump arrangements is opened whereby the underpressure guarantees that no cleaning fluid leaks into the cooling tank by valve 42.

During emptying of the milk tank valve 42 is closed and the connection 41 of the cooling tank is connected to the milk transport vehicle. At the same time valve 44 is opened and the milk line system is drained through the air separator of the return pump arrangement. This may be, but does not have to be, aided by the air separator being connected to the vacuum supply at 4, or by opening the draining valve means 8.

Once the milk tank has been emptied the connection at 41 is closed and valves 42 and 44 are opened. Cleaning fluid supplied by the tank-cleaning device 45 is then drained through the air separator without using the vacuum connection at 4. Therefore, the return transport pump 6 is working with atmospheric pressure at the suction side.

FIG. 5 shows another arrangement for a milking plant in accordance with b) above. In the illustrated arrangement, the flow of milk is led to a small buffer tank 50 during emptying and cleaning of the cooling tank 51. Once the cooling tank is back in use, the buffer tank is emptied by gravity feeding, simply by being placed in a elevated position relative the milk cooling tank 51. The buffer tank can be cleaned separately or together with the milk line system. FIG. 5 shows an arrangement with separate cleaning, making use of the cleaning device 52 in the buffer tank 50, similar to the cleaning device 53 in the milk cooling tank.

During milk production milk is passed from the milking robot via the milk line system 54 through valves 55 and 56 to the cooling tank 51. Valves 57, 58 and 59 are during filling of the cooling tank closed. When the milk line system is washed only, valves 55 and 58 are held opened whereas valves 57, 56 and 60 are closed. The air separator is connected to the vacuum at 4 in order to secure that no cleaning fluid leaks into neither the cooling tank by valve 56 nor to the buffer tank 50 by valves 57 or 60.

When the cooling tank is full valves 56 and 60 are closed, whereas valve 57 is opened. The milk from the milk line system is then transported to the buffer tank 50. The connecting pipe 61 between the cooling tank 51 and the milk line system is then removed and the cooling tank is then connected to the milk transport vehicle by a connection at 62. When the cooling tank 51 has been emptied it has to be cleaned, and also during cleaning milk from the milk line system is transported to the buffer tank 50. Valves 60 and 55 are thus still closed and valve 57 is opened.

Also valve 56 is closed whereas valve 58 is open. The air separator is connected to the vacuum supply at 4 during cleaning of the cooling tank, in order to prevent cleaning fluid to leak into the buffer tank. The connection 61 is re-installed and valve 59 is open so that cleaning fluid can be circulated in a tank cleaning loop by pump 63, thereby cleaning the cooling tank through means of the cleaning device 53. A separate cleaning fluid container and washing machine (not shown) is preferably provided in the tank cleaning loop. A drain valve (not shown) is also comprised in the tank cleaning loop, for dumping used cleaning fluid.

Once the milk-cooling tank is reinstated, valves 55, 56 and 57 are opened, leading milk both from the milk line system 54 and from the buffer tank 50 to the milk-cooling tank 51. Valves 60, 58 and 59 are closed, separating the cleaning fluid from the milk. Once the buffer tank 50 has been emptied through the force of gravity, valve 57 is closed and valve 60 is opened. Cleaning fluid is supplied to the buffer tank 50 through the cleaning device 52, and by use of the under pressure connected at 4 the cleaning fluid is drained by the return pump at the pressure that is lower than on the milk side of valves 57 and 58.

The embodiments of the invention as illustrated in the preceding FIGS. 3–5 all show how the proposed procedure together with the proposed return pump arrangement for cleaning fluids can be used to prevent mixture of cleaning fluid into the milk. An important aspect of cleaning of milk equipment is to get rid of any residue of rinse water in the pipes and hoses of the milk line system. The risk for residual rinse water to be present when the milk production starts is especially large in the long transport lines from the milking station, i.e. the milking robot, to the cooling tank. Due to the length of such a connection it is difficult to arrange it with a constant fall towards the output end. With the proposed method and apparatus a possibility is provided to suck air through the milk line system to the air separator of the return pump arrangement, with a flow such that any residual rinse water is dragged out leaving a dry milk line system.

As previously mentioned, there is in vacuum milking equipment an air separating container usually called an end unit. To the end unit arrives a flow of air mixed milk from the teat cups of the milk station. The air is passed out through the end unit through the connection to the vacuum supply and a vacuum pump, whereas the milk is pumped out by means of milk pump.

Figure 6:
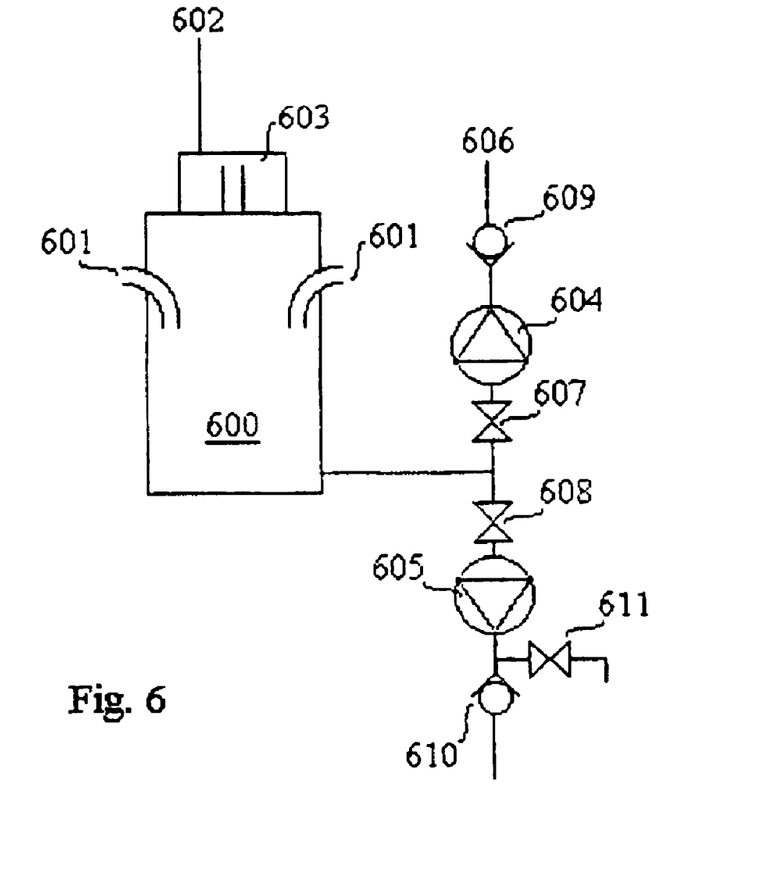
FIG. 6 shows a part of a milking plant according to the invention, illustrating pump and valve arrangements around the end unit.

In FIG. 6 there is an illustration of such an end unit 600 with connection 601 through which air mixed milk is supplied to the end unit 600. At the top of the end unit there is a connection 602 to the vacuum supply, by a liquid separator 603 divised to capture any drops of fluid flowing towards the vacuum at 602. The end unit arrangement presented in FIG. 6 is provided with two pumps 604 and 605. Pump 604 is devised to pump milk from the end unit to the cooling tank and can be specially devised for gentle pumping. Pump 604 is of course also used for cleaning the subsequent milk line system at 606. Pump 605 is devised for milk that is to be dumped and for cleaning of the milking equipment. The system separating valves 607 and 608 are held fully opened in order to ensure that the pumps are filled with fluid at start-up. The non-return valves 609 and 610 are there to prevent back-suction and the draining valve 611 is devised to prevent cleaning fluid or rinse water to be retained in the pump 605, which could leak into the milk. The arrangement according to FIG. 6 with two pumps makes it possible to work with a high capacity cleaning pump 605, such as a centrifugal pump. During cleaning of the end unit, with valve 607 closed, pump 605 together with the vacuum connection 602 ensures that the pressure on the cleaning fluid side of 607 is lower than on the milk side.

Figure 7:
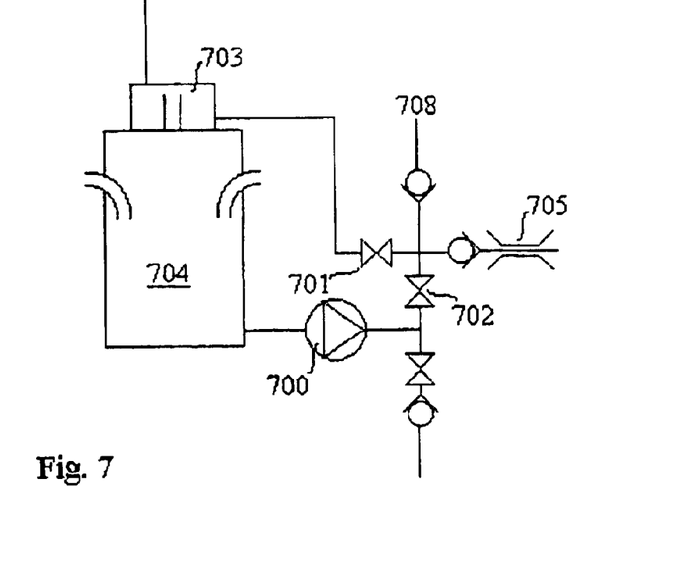
FIG. 7 shows parts of the milking plant in an embodiment according to the invention, similar to that of FIG. 6 but with a single pump arrangement.

FIG. 7 shows an arrangement similar to that of FIG. 6, but with only one pump 702. The valve 701 connects the output from the valve 702 to the vacuum system. This connection can be made to the liquid separator 703 of the end unit 704, were potential leakage is taken care of. This arrangement can be combined with an air intake 705 with low capacity so that leaking fluid is guaranteed to be sucked out.

When cleaning the end unit 704 but not the subsequent milking equipment at 708, valves 701 and 702 are closed thereby obtaining an atmospheric pressure on the milk side (upper side) of valve 74. The lower side of valve 74 however is still in contact with the vacuum from the end unit 76, guaranteeing that no leakage of cleaning fluid occurs into the milk.

Figure 8:
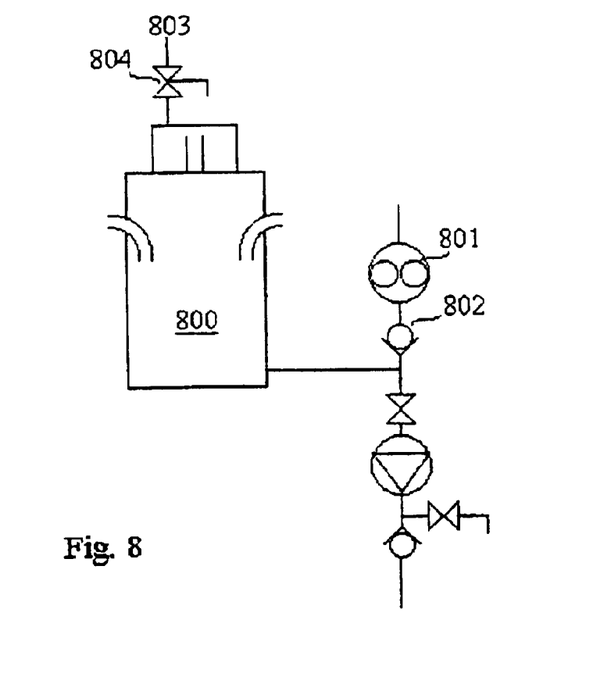
FIG. 8 shows another embodiment of the invention, similar to that of FIG. 6.

FIG. 8 shows yet another embodiment of the present invention using an end unit 800. As previously described in conjunction with FIG. 6, the pump towards the milk tank 801, corresponding to pump 604 in FIG. 6, can be especially devised for pumping milk. Such a pump can be a positive displacement pump, for instance a peristaltic pump. When using such a peristaltic pump, with a good suction capacity, the arrangement can be simplified as illustrated in FIG. 8. Since the pump 801 is capable of suction even without being contained with milk or water at the start-up, the non-return valve 802 can be placed at the inlet of the pump 801. The non-return valve 802 then becomes the system separator during cleaning. The underpressure in the line from the end unit both provides sealing power to the non-return valve 802 and security towards leakage of cleaning fluid into the milk.

In order to lower the demands of the milk transport pump 801, the connection 803 of the end unit 800 to the vacuum supply can be provided with a three-way valve 804, so that the end unit only works with underpressure during milking. After milking of each cow the valve 804 is adjusted so that air is let in whereby atmospheric pressure is obtained on the pre-milk surface. In accordance with the invention, valve 804 is of course adjusted to open the connection between the end unit 800 and the vacuum supply during cleaning of the end unit. This way leakage of cleaning fluid into the milk in the milk line system after the pump 801 is avoided, by means of the non-return valve 802.

An embodiment of the present invention using a so-called releaser instead of a milk pump can be used. Such milk transport arrangements are well known in the prior art and have been used for a long time. In the embodiment there is a non-return valve in the milk line system. It is placed in immediate connection to the end unit. The mid chamber of the releaser, "the lock chamber", is placed in the milk room above the cooling tank and is provided with the non-return valve for preventing back suction. The lock chamber is vacuum provided in a well-known way by valve means, so that the milk can flow in from the end unit. When the valve is adjusted so that the lock chamber is provided with atmospheric pressure, the non-return valve closes towards the end unit and the milk in the lock tank is emptied into the cooling tank. Since only milk from one cow at the time flows into the end unit, and the entire milking procedure as well as the valve is controlled by a central unit (not shown), the end unit can after each finished milking be provided with atmospheric pressure by means of a valve. Thereby the underpressure in the lock tank can also be used to lift and transport the milk.

When dumping milk that for some reason does not fulfil the demands on quality, and during cleaning, the pump is used. The end unit is then provided with vacuum, preventing mixture of cleaning fluid into the milk through the lock chamber, by means of the non-return valve. When cleaning the milk line system and the lock chamber of the releaser, the return pump is preferably used in order to provide a continuos flow of fluid. In coherence with what has been described for previous embodiments in conjunction with FIGS. 3–5, the air separator preceding the return pump is connected to the vacuum at a connection when there is milk present in the cooling tank and the milk line system is being cleaned.

Several embodiments and procedures for using those embodiments have been described in the proceeding text. Common for all embodiments is the inventive concept to use an underpressure provided by the vacuum supply of the milking plant, to the cleaning fluid in order to prevent cleaning fluid to leak into the milk when cleaning sub-units of the milk plant, in the context of the present invention the milk animal may of course be a cow, however, any other milk animal such as sheep, goat, horse or buffalo may also be intended.

What is claimed is:

1. A milking plant for milking animals, comprising:
   milk collecting means, attachable to teats of said animals;
   a vacuum supply system, connected to said milk collecting means, and used for withdrawing milk from said teats;
   a milk line system connected to the collecting means;
   milk storage means, connectable to the milk line system by;
   milk storage valve means, that is selectively adjustable to prevent fluid communication between said milk line system and said milk storage means during cleaning of the milk line system, said milk storage valve means characterised by;
   pressure regulating means, capable of arranging a lower fluid pressure in the milk line system than in the milk storage means, when said milk storage valve means are closed.

2. The milking plant as recited by claim 1, further comprising cleaning means having a cleaning fluid supply, a cleaning fluid washer, a cleaning fluid return pump, and a cleaning fluid supply line system connected to the milk line system and to the cleaning fluid supply, the cleaning fluid supply line system selectively capable of fluid communication therewith through cleaning fluid valve means, and connectable to the milk collecting means, thereby obtaining a closed fluid communicating loop.

3. The milking plant as recited in claim 2, further comprising an air separator with an intake connected to the cleaning fluid supply line system for return flow of cleaning fluid from the milk line system, an air outlet selectively connected to the vacuum supply system, and an output connected to the cleaning fluid pump.

4. The milking plant as recited in claim 3, wherein said air separator further comprises a cleaning fluid drainage valve.

5. The milking plant as recited in claim 4, wherein said cleaning fluid return pump has an output connected to a non-return valve, preventing fluid flow back into said cleaning fluid return pump.

6. The milking plant as recited in claim 5, wherein the cleaning fluid return pump is a centrifugal pump comprising an impeller connected to the air separator with the center of said impeller located immediately against said output of the air separator.

7. The milking plant as recited in claim 6, wherein said milk storage means comprises a milk cooling tank.

8. A method for cleaning of a milking plant for milking animals, the milk plant comprising milk collecting means, attachable to teats of said animals, a, milk storage means, a milk line system connected to the collecting means and connectable to the milk storage means by milk storage valve means, selectively adjustable to prevent fluid communication between said milk line system and said milk storage means during cleaning of the milk line system, characterized by the steps of
   closing said milk storage valve means;
   arranging a cleaning fluid circulation loop by connecting said milk collecting means and said milk line system to a cleaning fluid supply, and
   arranging a lower fluid pressure in the cleaning fluid circulation loop than in the milk storage means.

9. The method as recited in claim 8, wherein the steps of arranging a lower fluid pressure in the cleaning fluid circulation loop is obtained by connecting it to said vacuum supply system.

10. A milking plant used to collect milk from an animal comprising:
    a milk collector that receives milk from the animal;
    a tank;
    a milk conduit leading from the milk collector to the tank;
    a cleaning fluid supply;
    a cleaning fluid conduit connected to the milk conduit;
    a valving arrangement connected to the milk conduit and the cleaning fluid conduit and having one setting that enables milk to flow from the milk collector through the milk conduit and another setting that allows cleaning fluid from the cleaning fluid supply to flow through the milk conduit;
    a vacuum supply connected to the valving arrangement that applies a vacuum to the cleaning fluid conduit to prevent cleaning fluid in the cleaning fluid conduit from entering the milk conduit when the valving arrangement is set to enable milk to flow through the milk conduit.

11. The milking plant as recited in claim 10 wherein the milk collector comprises a milking station having a plurality of teat cups, the tank comprises a milk cooling tank, the milk conduit comprises a transport line through which milk can flow, the valving arrangement comprises a plurality of valves with one of the valves disposed in a closed position and another one of the valves disposed in an open position permitting flow of milk from the milking station to the milk cooling tank, and the one of the valves disposed in an open position and the another one of the valves disposed in a closed position permitting flow of cleaning solution through the transport line, and the vacuum supply comprises a milking vacuum system.

12. The milking plant as recited in claim 11 further comprising a cleaning solution supply connected to the plurality of teat cups, wherein cleaning solution from the supply is introduced through the plurality of teat cups into the transport line to clean the transport line.

13. The milking plant as recited in claim 12 wherein the cleaning solution comprises a detergent.

14. The milking plant as recited in claim 10 further comprising a pump that draws cleaning solution out of the milk conduit.

15. The milking plant as recited in claim 14 further comprising an air separator disposed upstream of the pump and downstream of the milk conduit.

16. The milking plant as recited in claim 15 wherein the pump comprises a centrifugal pump and the vacuum supply applies the vacuum to the air separator.

17. The milking plant as recited in claim 15 further comprising a second pump disposed downstream of the air separator with one of the pumps comprising a milk pump that pumps milk from the air separator to the milk cooling tank and the other one of the pumps comprising a milk dump pump.

18. The milking plant as recited in claim 10 further comprising a separator in communication with the cleaning fluid conduit, wherein the milk collector comprises a milking station having a plurality of teat cups, the tank comprises a milk cooling tank, the milk conduit comprises a transport line through which milk can flow, the valving arrangement comprises a plurality of valves with one of the valves disposed in a closed position and another one of the valves disposed in an open position permitting flow of milk from the milking station through the milk conduit to the milk cooling tank, and the one of the valves disposed in an open position and the another one of the valves disposed in a closed position permitting flow of cleaning solution through the tank and into the cleaning fluid conduit, and the vacuum supply line comprises a milking vacuum system that is connected to the separator.

19. The milking plant as recited in claim 18 further comprising a second tank that holds milk when cleaning solution is introduced in the milk cooling tank and wherein the separator comprises an air separator.

20. A milking plant for milking animals, comprising:
  a milk collector that is attachable to teats of a milking animal;
  a vacuum supply system connected to said milk collector that provides a vacuum which facilitates withdrawal of milk from said teats;
  a milk line system connected to the milk collector; and
  a milk storage tank that is connected to the milk line system;
  a milk storage valve that is selectively adjustable to prevent fluid communication between said milk line system and said milk storage tank during cleaning of the milk line system; and
  a pressure regulator capable of producing a lower fluid pressure in the milk line system than in the milk storage tank when said milk storage valve is closed.

21. A milking plant for milking animals, comprising:
  a milk collector that is attachable to teats of a milking animal;
  a vacuum supply system connected to said milk collector that provides a vacuum which facilitates withdrawal of milk from said teats;
  a milk line system connected to the milk collector; and
  a milk storage tank that is connected to the milk line system;
  a milk storage valve that is selectively adjustable to prevent fluid communication between said milk line system and said milk storage tank during cleaning of the milk line system;
  a pressure regulator capable of producing a lower fluid pressure in the milk line system than in the milk storage tank when said milk storage valve is closed; and
  a cleaning arrangement that includes a cleaning fluid supply, a cleaning fluid washer, a cleaning fluid return pump, and a cleaning fluid supply line system that is connected to said milk line system and to said cleaning fluid supply.

22. The milking plant as recited in claim 21 further comprising a cleaning valve, wherein the cleaning fluid supply line system is selectively capable of fluid communication with said cleaning arrangement through said cleaning fluid valve, and which is connectable to said milk collector, thereby providing a closed fluid communicating loop.

23. A milking plant for milking animals, comprising:
  a milk collector that is attachable to teats of a milking animal;
  a vacuum supply system connected to said milk collector that provides a vacuum which facilitates withdrawal of milk from said teats;
  a milk line system connected to the milk collector;
  a milk storage tank that is connected to the milk line system;
  a milk storage valve that is selectively adjustable to prevent fluid communication between said milk line system and said milk storage tank during cleaning of the milk line system;
  a pressure regulator capable of producing a lower fluid pressure in the milk line system than in the milk storage tank when said milk storage valve is closed;
  a cleaning arrangement that includes a cleaning fluid supply, a cleaning fluid washer, a cleaning fluid return, and a cleaning fluid supply line system that is connected to said milk line system and to said cleaning fluid supply; and
  an air separator with an intake connected to said cleaning fluid supply line system for return flow of cleaning fluid from the milk line system, an air outlet selectively connected to said vacuum supply system, and an output connected to said cleaning fluid pump.

24. A milking plant for milking animals, comprising:
  a milk collector that is attachable to teats of a milking animal;
  a vacuum supply system connected to said milk collector that provides a vacuum which facilitates withdrawal of milk from said teats;
  a milk line system connected to the milk collector;
  a milk storage tank that is connected to the milk line system;
  a milk storage valve that is selectively adjustable to prevent fluid communication between said milk line system and said milk storage tank during cleaning of the milk line system;
  a pressure regulator capable of producing a lower fluid pressure in the milk line system than in the milk storage tank when said milk storage valve is closed;

a cleaning arrangement that includes a cleaning fluid supply, a cleaning fluid washer, a cleaning fluid return pump that has an output connected to a non-return valve, and a cleaning fluid supply line system that is connected to said milk line system and to said cleaning fluid supply; and an air separator with an intake connected to said cleaning fluid supply line system for return flow of cleaning fluid from the milk line system, an air outlet selectively connected to said vacuum supply system, an output connected to said cleaning fluid pump, and a cleaning fluid drainage valve.

* * * * *